United States Patent
Xing et al.

(10) Patent No.: US 11,746,056 B2
(45) Date of Patent: Sep. 5, 2023

(54) MODIFIED NITA$_2$O$_6$-BASED MICROWAVE DIELECTRIC CERAMIC MATERIAL CO-SINTERED AT LOW TEMPERATURE AND ITS PREPARATION METHOD

(71) Applicant: Yangtze Delta Region Institute of University of Electronic Science and Technology of China, Huzhou, Huzhou (CN)

(72) Inventors: MengJiang Xing, Kunming (CN); XiaoZhen Li, Huzhou (CN); HongYu Yang, Xi'an (CN); MingShan Qu, Chengdu (CN)

(73) Assignee: Yangtze Delta Region Institute of University of Electronic Science and Technology of China, Huzhou, Huzhou (CN)

( * ) Notice: Subject to any disclaimer, the term of this patent is extended or adjusted under 35 U.S.C. 154(b) by 0 days.

(21) Appl. No.: 17/979,922

(22) Filed: Nov. 3, 2022

(65) Prior Publication Data
US 2023/0132916 A1    May 4, 2023

(30) Foreign Application Priority Data
Nov. 3, 2021    (CN) .......................... 202111292031.5

(51) Int. Cl.
*C04B 35/495*    (2006.01)
*C04B 35/64*    (2006.01)
*C04B 35/626*    (2006.01)

(52) U.S. Cl.
CPC ........ *C04B 35/495* (2013.01); *C04B 35/6261* (2013.01); *C04B 35/64* (2013.01);
(Continued)

(58) Field of Classification Search
CPC .............. C04B 35/495; C04B 35/6261; C04B 2235/3255; C04B 2235/3279;
(Continued)

(56) References Cited

FOREIGN PATENT DOCUMENTS

GB    2149120 A    *    6/1985    ............. G01N 27/12

OTHER PUBLICATIONS

Crystal Structure and Microwave Dielectric Properties of ATiO3, ATa2O6, AWO4 (A=Ni, Mg, Co) Ceramics, Eung Soo Kim, 2009 18th IEEE international symposium on the applications of ferroelectrics, pp. 1-6.
(Continued)

*Primary Examiner* — Karl E Group
*Assistant Examiner* — Cameron K Miller
(74) *Attorney, Agent, or Firm* — Zhigang Ma

(57) ABSTRACT

The invention belongs to the field of electronic ceramics and its manufacturing, in particular to the modified NiTa$_2$O$_6$-based microwave dielectric ceramic material co-sintered at low temperature and its preparation method. Based on the low melting point characteristics of CuO and B$_2$O$_3$, and the radius of Cu$^{2+}$ ions is similar to that of Ni$^{2+}$ and Ta$^{5+}$ ions, the chemical general formula of the invention is designed as xCuO-(1-x)NiO-[7.42y+(xy/14.33)]B$_2$O$_3$—Ta$_2$O$_5$, and the molar content of each component is adjusted from raw materials. The main crystalline phase of NiTa$_2$O$_6$ is synthesized at a lower pre-sintering temperature, and NiTa$_2$O$_6$-based ceramic material with low-temperature sintering characteristics and excellent microwave dielectric properties are directly synthesized at one time, which broadened the application range in LTCC field.

2 Claims, 2 Drawing Sheets

(52) U.S. Cl.
CPC ............... *C04B 2235/3255* (2013.01); *C04B 2235/3279* (2013.01); *C04B 2235/3281* (2013.01); *C04B 2235/3409* (2013.01); *C04B 2235/6567* (2013.01); *C04B 2235/66* (2013.01)

(58) Field of Classification Search
CPC .... C04B 2235/3281; C04B 2235/3409; C04B 2235/6567; C04B 2235/66
See application file for complete search history.

(56) References Cited

OTHER PUBLICATIONS

Effect of B2O3 Additives on Sintering and Microwave Dielectric Behaviors of CuO-Doped ZnNb2O6 Ceramics, Cheng-Liang Huang, The Japan Society of Applied Physics, pp. 758-762.

CNIPA, Notification of a First Office Action for CN202111292031.5, dated Apr. 8, 2022.

University of Electronic Science and Technology (Applicant), Reply to Notification of a First Office Action for CN202111292031.5, w/ (allowed) original claims dated Nov. 3, 2021, dated Aug. 22, 2022.

CNIPA, Notification to grant patent right for invention in CN202111292031.5, dated Sep. 5, 2022.

\* cited by examiner

MODIFIED NITA$_2$O$_6$-BASED MICROWAVE DIELECTRIC CERAMIC MATERIAL CO-SINTERED AT LOW TEMPERATURE AND ITS PREPARATION METHOD

TECHNICAL FIELD

The present invention belongs to the field of electronic ceramics and its manufacturing, and relates to a modified NiTa$_2$O$_6$-based microwave dielectric ceramic material co-sintered at low temperature and its preparation method.

BACKGROUND

The fifth generation mobile communication technology is abbreviated as 5G. With the development of 5G technology, the demand for electronic components used in high frequency conditions like millimeter wave band, such as electronic circuit boards, dielectric antennas and waveguides, is increasing. As a new type of three-dimensional integrated packaging and interconnection technology, low-temperature co-fired ceramic (LTCC) technology provides a reliable solution for preparing ceramic modules or integrated circuits with embedded electrodes because of its excellent electrical, mechanical, thermal and technological characteristics. Therefore, the development of ceramic systems applied to LTCC technology is a hot research topic at present.

Generally, ceramic materials need to be sintered at a high temperature (>1000° C.) to achieve densification and good microwave dielectric properties. However, due to the fact that the melting points of electrode materials such as Ag, Au, Cu, etc., which are mainly used in electronic devices at present, are generally lower than 1000° C., the ceramic materials can't be co-fired with Ag or Cu electrodes in LTCC technology (co-firing with Ag electrodes should not exceed 950° C.; Co-firing with Cu electrode should not exceed 1000° C. and be carried out in reducing atmosphere). For example, NiTa$_2$O$_6$ ceramics with tetragonal Tri-rutile structure have been reported to have excellent microwave dielectric properties at 1400~1600° C.: $\varepsilon_r$=25~27, q×f=31200 GHz, $\tau_f$=26~35 ppm/° C. However, the sintering temperature of this system is too high, which limits its further application in LTCC field. At present, no research has been found to reduce the sintering temperature of this kind of ceramics. Therefore, how to reduce the sintering temperature of NiTa$_2$O$_6$ ceramics and keep its low loss characteristics has become a difficult point in this field.

SUMMARY

In view of the above problems or deficiencies, in order to solve the problem that the existing NiTa$_2$O$_6$ ceramics are limited in further application in LTCC field due to high sintering temperature, the present invention provides a modified NiTa$_2$O$_6$-based microwave dielectric ceramic material co-sintered at low temperature and its preparation method, which effectively reduces the sintering temperature while keeping low dielectric loss, so that it can be widely applied to LTCC technical field.

The technical scheme adopted by the invention is:

A modified NiTa$_2$O$_6$-based microwave dielectric ceramic material co-sintered at low temperature, and its general chemical formula is:

xCuO-(1-x)NiO-[7.42y+(xy/14.33)]B$_2$O$_3$—Ta$_2$O$_5$, and wherein 0.02≤x≤0.2; 0.02≤y≤0.08; and prepared by solid-phase method; and the phase composition is NiTa$_2$O$_6$ structure;

and the sintering temperature of the dielectric ceramic material is 900-975° C., and the dielectric ceramic material is pre-sintered in the atmosphere environment of 850-900° C.; in addition, the dielectric constant is 16~23, the quality factor Q×f value is 12,000~19,000 GHz, and the temperature of frequency is 20~27 ppm/° C.

Preferably, when x=0.1 and y=0.04, the dielectric constant of the material is 22.4 at the sintering temperature of 925° C., the quality factor Q×f value is 18531 GHz, and the temperature of frequency is 25.2 ppm/° C., which can be widely used in LTCC technical field.

The preparation method of the modified NiTa$_2$O$_6$-based microwave dielectric ceramic material co-sintered at low temperature comprises the following steps:

step 1, mix CuO, NiO, B$_2$O$_3$ and Ta$_2$O$_5$ original powder according to the general chemical formula: xCuO-(1-x)NiO-[7.42y+(xy/14.33)]B$_2$O$_3$—Ta$_2$O$_5$, and wherein 0.02≤x≤2; 0.02≤y≤0.08;

step 2: put the powder mixed in step 1 into a ball milling tank, and perform ball milling with zirconia balls and deionized water according to the mass ratio of powder: zirconia balls: deionized water of 1:4-6:3-5, perform the planetary ball milling for 6-8 hours, take it out, dry it in an oven at 80-120° C., sieve it with a 60-80 mesh sieve, and pre-sinter it in an atmosphere environment environment at 850-900° C. for 3~5 hours;

step 3: perform ball milling on the powder pre-sintered in step 2 again according to the mass ratio of powder: zirconium balls: deionized water of 1:4-6:1-3, and perform planetary ball milling and mixing for 3-6 hours, take it out and dry, and add polyvinyl alcohol solution into the obtained powder for granulation;

step 4, press and mold the ceramic raw material prepared in step 3, discharge the glue at 600-650° C., and then sinter in the atmosphere environment environment at 900-975° C. for 4-6 hours to obtain the modified NiTa$_2$O$_6$-based microwave dielectric ceramic material sintered at low temperature.

Based on the low melting point characteristics of CuO and B$_2$O$_3$, and the radius of Cu$^{2+}$ ions is similar to that of Ni$^{2+}$ and Ta$^{5+}$ ions, the chemical general formula is designed as xCuO-(1-x)NiO-[7.42y+(xy/14.33)]B$_2$O$_3$—Ta$_2$O$_5$, and the molar content of each component is adjusted from raw materials. And the main crystalline phase of NiTa$_2$O$_6$ is synthesized at a lower pre-sintering temperature, and NiTa$_2$O$_6$-based ceramic materials with low-temperature sintering characteristics and excellent microwave dielectric properties are directly synthesized at one time, which broadened the application range in LTCC field.

DETAILED DESCRIPTION OF THE INVENTION

The present invention will be further explained in detail below with reference to the figures and embodiments.

step 1, mix CuO, NiO, B$_2$O$_3$ and Ta$_2$O$_5$ original powder In molar ratio according to the general chemical formula: xCuO-(1-x)NiO-[7.42y+(xy/14.33)]B$_2$O$_3$—Ta$_2$O$_5$(x=0.1; y=0.04);

step 2, put the powder mixed in step 1 into a ball milling tank, take zirconium balls and deionized water as grinding media and perform planetary ball milling with zirconium balls and deionized water according to the mass ratio of powder: zirconium balls: deionized water of 1:6:4 for 6 hours, take it out, dry it in an oven at 100° C., sieve it with a 60 mesh sieve, and pre-sinter it in an atmosphere environment environment at 900° C. for 3 hours;

step 3, perform the second ball milling on the pre-sintered powder, and perform planetary ball milling according to the mass ratio of powder: zirconium balls: deionized water of 1:6:3, for 4 hours, take it out and dry, and add 5%-8% polyvinyl alcohol solution into the obtained powder for granulation;

step 4, put the granulated powder into a mold of φ12 and form it into a cylinder block (size: 12 mm×6 mm) by dry-pressing under pressure of 20 MPa. Then, keep the cylinder block at 650° C. for 2 hours to remove the binder, and then raise it to 900° C.~975° C. for 4 hours. Finally, the modified $NiTa_2O_6$-based microwave dielectric ceramic material under the condition of low-temperature sintering is prepared. The molar ratios of its chemical formulas are: $CuO$—$NiO$—$B_2O_3$—$Ta_2O_5$ (4.4:39.2:12.9:43.5 mol %).

Figure 1:
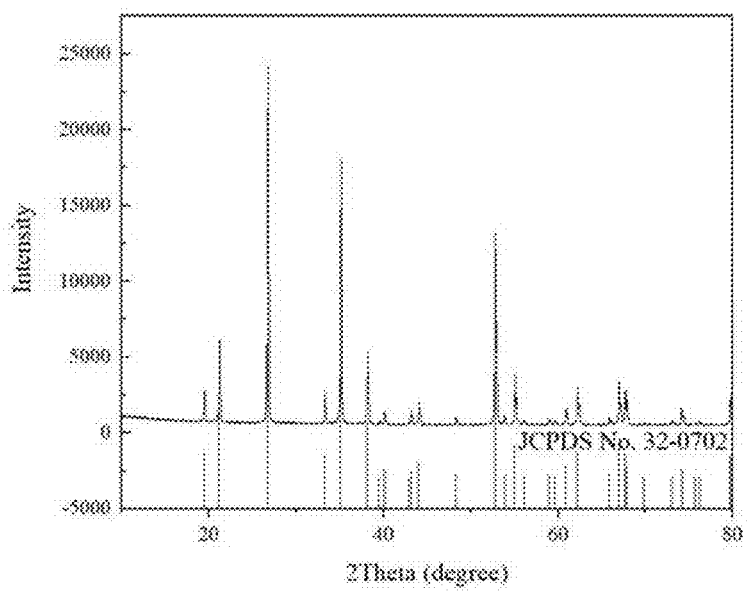
FIG. 1 shows X-ray diffraction (XRD) pattern of ceramic sample corresponding to embodiment 3.

Four samples of Embodiments are made according to the above steps. And FIG. 1 shows the X-ray diffraction (XRD) pattern of ceramic sample corresponding to embodiment 3. Compared with the standard card, it is found that the standard card JCPDS card No. 32-0702 of $NiTa_2O_6$ has a good match. The shift of the X-ray diffraction peak indicates that ions are solid dissolved to the cationic lattices, and the existence of the second phase is not detected in the system, indicating that this type of ceramic belongs to the solid solution of $NiTa_2O_6$ structure.

Figure 2:
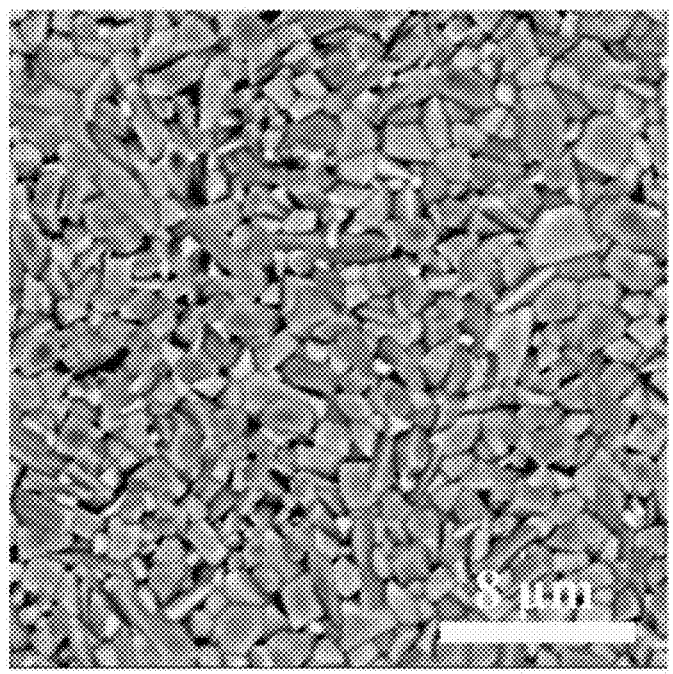
FIG. 2 shows a morphology diagram of the ceramic sample corresponding to the embodiment 3 under a scanning electron microscope (SEM).

FIG. 2 shows a morphology diagram microscope of SEM corresponding to embodiment 3. The crystalline grain growth of the sample is sufficient and the crystalline grain boundary is clearly visible, indicating that its low-temperature sintering characteristics are good.

Components and microwave dielectric properties of specific embodiments as follows:

| Embodiment | Mass of each component/α | | | | Sintering temperature ° C. |
|---|---|---|---|---|---|
| | CuO | NiO | $B_2O_2$ | $Ta_2O_5$ | |
| 1 | 1.479 | 12.501 | 3.846 | 82.174 | 900 |
| 2 | 1.479 | 12.501 | 3.846 | 82.174 | 925 |
| 3 | 1.479 | 12.501 | 3.846 | 82.171 | 950 |
| 4 | 1.479 | 12.501 | 3.846 | 82.174 | 975 |

Table 1 shows the components of the samples of each embodiment.

| Embodiment | External diameter (mm) | Thickness (mm) $\varepsilon_r$ | Dielectric coefficient | Tanδ ($10^{-3}$) | Q × f(GHz) | $\tau_f$ (ppm/° C.) |
|---|---|---|---|---|---|---|
| 1 | 11.19 | 4.53 | 16.8 | 7.5 | 12387 | 20.6 |
| 2 | 10.74 | 4.41 | 19.2 | 5.8 | 16215 | 22.4 |
| 3 | 10.48 | 4.32 | 22.4 | 5.0 | 18531 | 25.2 |
| 4 | 10.32 | 4.25 | 20.5 | 6.1 | 15224 | 26.8 |

Table 2 shows the microwave dielectric properties of the samples of each embodiment.

From the above Tables, it can be seen that when x=0.1 and y=0.4, the sintering temperature is in the range of 900~950° C., the dielectric constant and Q×f value of modified $NiTa_2O_6$-based ceramic materials first increase and then decrease, and the best values are obtained at 950° C.: $\varepsilon_r$=22.4, tan δ=5.0×10$^{-4}$, Q×F=18531 GHz, $\tau_f$=25.2 ppm/° C. And compared with the existing literature reports, the sintering temperature is greatly reduced, and the microwave dielectric property is still relatively excellent at this time, so it can be widely used in LTCC technical field.

What is claimed is:

1. A modified $NiTa_2O_6$-based microwave dielectric ceramic material co-sintered at low temperature is characterized in that a general chemical formula of the modified $NiTa_2O_6$-based microwave dielectric ceramic material co-sintered at low temperature is as follows: $xCuO$-$(1-x)NiO$-$[7.42y+(xy/14.33)]B_2O_3$—$Ta_2O_5$, wherein 0.02≤x≤0.2; 0.02≤y≤0.08; and the modified $NiTa_2O_6$-based microwave dielectric ceramic material is prepared by solid-phase method; and a phase composition of the modified $NiTa_2O_6$-based microwave dielectric ceramic material is $NiTa_2O_6$ structure;

wherein a sintering temperature of the modified $NiTa_2O_6$-based microwave dielectric ceramic material is 900-975° C., and the modified $NiTa_2O_6$-based microwave dielectric ceramic material is pre-sintered in an atmosphere environment at 850-900° C.; a dielectric constant of the modified $NiTa_2O_6$-based microwave dielectric ceramic material is 16~23, a quality factor Q×f value of the modified $NiTa_2O_6$-based microwave dielectric ceramic material is 12,000~19,000 GHz, and a temperature of frequency of the modified $NiTa_2O_6$-based microwave dielectric ceramic material is 20~27ppm/° C; and wherein the modified $NiTa_2O_6$-based microwave dielectric ceramic material co-sintered at low temperature is prepared by following steps:

step 1, mixing CuO, NiO, $B_2O_3$ and $Ta_2O_5$ original powder according to the general chemical formula: $xCuO$-$(1-x)NiO$-$[7.42y+(xy/14.33)]B_2O_3$—$Ta_2O_5$, wherein 0.02≤x≤0.2; and 0.02≤y≤0.08;

step 2, putting the mixed powder in the step 1 into a ball milling tank, performing planetary ball milling with zirconia balls and deionized water according to a mass ratio of the mixed powder: the zirconia balls: the deionized water of 1: 4-6: 3-5 for 6-8 hours, and then taking out and drying in an oven at 80-120° C., sieving with a 60-80 mesh sieve to obtain sieved powder, and pre-sintering the sieved powder in the atmosphere environment at 850-900° C. for 3-5 hours;

step 3, performing the planetary ball milling on the pre-sintered powder in the step 2 again according to a mass ratio of the pre-sintered powder: the zirconium balls: the deionized water of 1: 4-6: 1-3, and performing the planetary ball milling and mixing for 3-6 hours, and then taking out and drying to obtain dried powder, and adding polyvinyl alcohol solution into the dried powder for granulation to obtain ceramic raw material; and step 4, pressing and molding the ceramic raw material obtained in the step 3, discharging at 600-650° C., and then sintering in the atmosphere environment at 900-975° C. for 4-6 hours to obtain the modified $NiTa_2O_6$-based microwave dielectric ceramic material co-sintered at low temperature.

2. The modified $NiTa_2O_6$-based microwave dielectric ceramic material co-sintered at low temperature according to claim 1 is characterized in that when x=0.1 and y=0.04, the dielectric constant of the modified $NiTa_2O_6$-based microwave dielectric ceramic material is 22.4 at the sintering temperature of 925° C., the quality factor Q×f value of the modified $NiTa_2O_6$-based microwave dielectric ceramic material is 18531 GHz, and the temperature of frequency of the modified $NiTa_2O_6$-based microwave dielectric ceramic material is 25.2 ppm/° C.

* * * * *